Jan. 26, 1965 J. E. RUSSO 3,167,625

MOUNTING STRUCTURE FOR ELECTROMAGNETIC SEALED RELAY

Filed Sept. 26, 1962

INVENTOR.
JAMES E. RUSSO

BY Brumbaugh, Free, Graves & Donohue

ATTORNEYS

United States Patent Office 3,167,625
Patented Jan. 26, 1965

3,167,625

MOUNTING STRUCTURE FOR ELECTROMAGNETIC SEALED RELAY

James E. Russo, Locust, N.J., assignor to Wheelock Signals, Inc., Long Branch, N.J., a corporation of New Jersey Filed Sept. 26, 1962, Ser. No. 226,236
1 Claim. (Cl. 200—87)

This invention relates to a novel sealed relay suited for use where sensitive, dependable, high-speed operation is desired.

In one conventional sealed relay, the contacts are mounted within a glass tube, and extend from opposite ends of the glass tube. These external conductors are electrically connected in the circuit in which the sealed relay is to function. However, due care must be exercised in connecting these conventional sealed relays in an electrical circuit because the stresses placed on the external conductors are transmitted to the glass tube and can change the electrical operating characteristics or cause damage thereto, such as by breaking the glass tube, weakening the connection with the enclosed contacts or perhaps breaking the seal and permitting escape of any inert gas within the sealed tube. Such conventional sealed relays are not suited for use in applications where the relay must be plugged in or removed from a socket of a circuit board or for mounting on circuit boards which are subject to flexure. When attempts to overcome this are made such as by encapsulating the switch in plastic compounds or the like, damage to the glass capsule may result from the stresses caused by curing of the compound. Moreover, the conductors of a conventional encapsulated sealed relay, when mounted in a circuit, are so oriented that electrical testing cannot be performed on the relay from both sides of the circuit board. Still further disadvantages of conventional encapsulated relays are that the glass enclosed reeds may be distorted or damaged while the molded material in which the sealed relay is encapsulated is cooling off or due to overheating by the flow of current in the actuating coil or through the switch itself.

The sealed relay of the present invention is designed for use in connection with such mounting applications on rigid or flexible circuit boards without any danger that the sealed tube or capsule will be damaged by stresses on the leads when inserting or removing the sealed relay from the socket of the circuit board or when soldered in place on a circuit board. The sealed relay of the present invention comprises a toroidal, spool-like insulated frame having a solenoid winding thereon, a sealed contact capsule carried within the frame, the external conductors of which are rigidly anchored to the frame. The anchorages between the external conductors and the frame isolate the ends of these conductors from the sealed capsule so that any strains imposed on the latter when they are mounted on or removed from a circuit board will not cause damage to the sealed capsule. In the sealed relay of the present invention, any strains applied to the leads are transmitted to the spool-like frame rather than to the fragile sealed capsule.

The sealed relay of the present invention also affords good ventilation through the open coil to permit dispersion of heat which, as explained above, may cause distortion or damage during the manufacture and use of conventional encapsulated sealed relays.

For a more complete understanding of the present invention, reference may be made to the detailed description which follows, and to the accompanying drawings, in which.

Figures 1, 2:
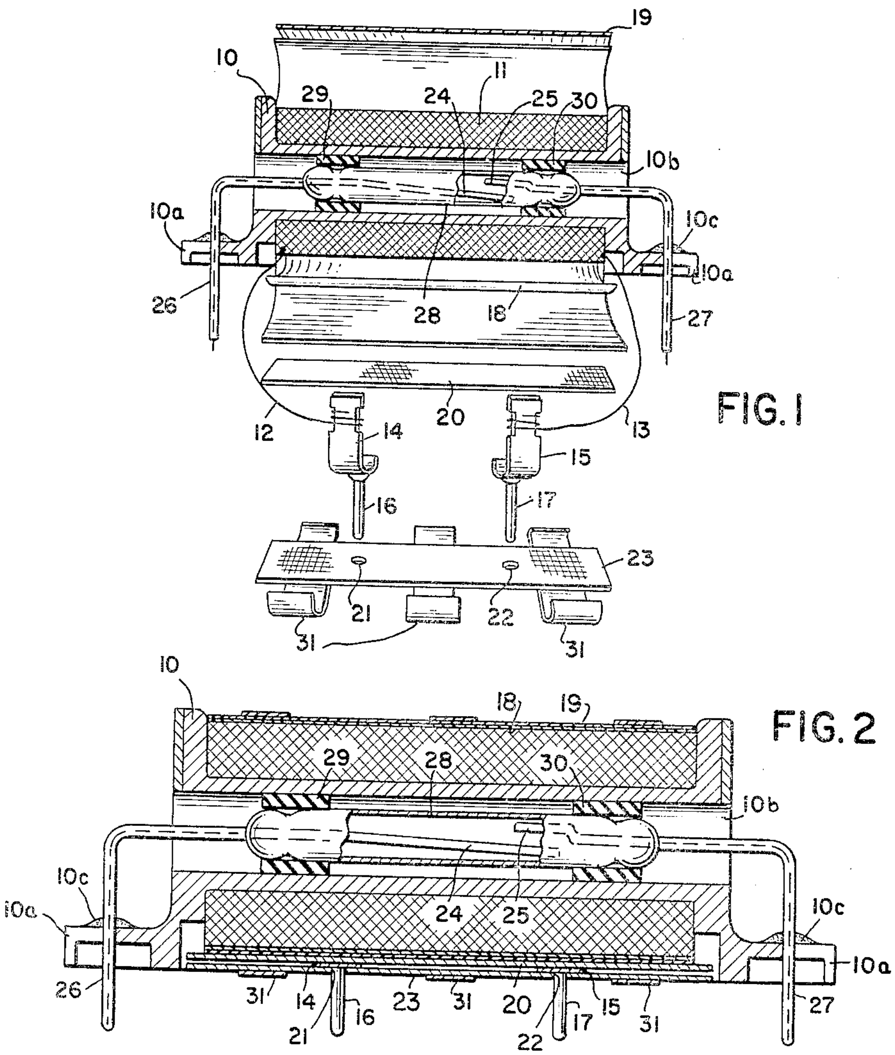
FIGURE 1 is an exploded view in vertical section of a switch embodying the reed relay mechanism of the present invention.
FIGURE 2 is an assembly view of a switch embodying the invention in vertical section.

In the reed relay switch shown in FIGURES 1 and 2, a toroidal spool-like frame 10 of insulating material supports a coil winding 11 of an insulated electrical conductor formed preferably of hair-thin magnet wire wound helically on the spool portion of the frame 10. At each end of the frame an extension 10*a* which projects outwardly and downwardly from the spool portion forms a supporting base for the frame.

The ends 12 and 13 of the winding 11 are doubled and twisted for increased strength and wound around and soldered to notched portions of arcuately shaped terminal lugs 14 and 15 which are formed of electrically and thermally conductive material. The lugs 14 and 15 are shaped in complementary fashion to the outer surface of the winding 11. The terminal lugs 14 and 15 are relatively long and wide providing a large surface over which heat generated electrical resistance may be dissipated. The terminal lugs 14 and 15 carry downwardly depending pins 16 and 17, respectively, fixed and electrically connected thereto, such as by solder, welding or some other satisfactory means. The winding 11 is energized by the application of an electrical potential across the pins 16 and 17.

The winding 11 is enveloped by an interior protective coil wrap 18 formed preferably of some insulating paper, for example, manila paper or kraft paper coated with insulating varnish, and an exterior protective coil wrap 19 which may be an insulating vulcanized fiber, silicone rubber, or other suitably protective insulating material. A rectangular insulating protective pad 20 is interposed between the outer surface of the exterior protective coil wrap 19 and the terminal lugs 14 and 15. The pad 20 provides additional insulation and prevents the winding 11 and the protective wraps 18 and 19 from being gouged by the terminal lugs 14 and 15. The pins 16 and 17 extend downwardly through aligned apertures 21 and 22 in a rigid terminal base strip 23 formed preferably of some hard electrically nonconducting material, such as mica or porcelain which forms a base for the sealed relay substantially coplanar with the bases of the extensions 10*a* of the frame 10.

A reed switch is accommodated within a central opening 10*b* of the frame 10. The switch comprises a pair of overlapping cantilevered contacts 24 and 25 accommodated at opposite ends within a sealed glass tube or capsule 28. The contacts 24 and 25 are made of lightweight, resilient, magnetic material, and the inherent resiliency maintains the contacts spaced apart, or that is to say, in open condition, until they are closed by magnetic force produced by the energization of the winding 11.

The ends of the contacts 24 and 25 extend beyond the ends of the sealed capsule and are bent downwardly and pass through slots in the bases 10*a* of the spool-like frame to form rigid depending pin connectors. If desired, the portions of the conductors 26 and 27 between the ends of the sealed capsule and the supporting bases of the frame can be insulated. The conductors 26 and 27 are anchored within the slots of the bases 10*a*, such as by a resinous adhesive 10*c* injected into the slots in the bases 10*a*. By thus anchoring the conductors 26 and 27 within the slots of the bases 10*a*, the contacts 24 and 25 are isolated from any strains imposed on the downwardly depending switch plugs when they are plugged into, pinned and soldered to or removed from the plug holes of a printed circuit board.

The reed switch is cushioned against shocks and vibrations by a pair of resilient rubber collars 29 and 30 interposed between the outer periphery of the glass capsule and the inner periphery of the central opening 10*b* of the spool-like frame.

A plurality of adhesive bands 31 encircle the outer wrapping 19 and hold the rigid base 23 to the bottom of the relay. If desired, a casing can be provided to enclose the bands 31.

It is apparent that the reed relay switch is subject to many different embodiments. For example, two switches can be supported within the hollow core of one coil or several switches and coils may be mounted together as one unit. A variety of switching functions can be provided for by the combination of reed switches and coils. The magnetic fields of several coils may coact with a plurality of switches or coact with each other to accomplish some desired sequence of switching operation. Moreover, magnetic shielding can be added to the switch to prevent interference by stray magnetic fields with switch operation.

A switch as described according to the present invention can operate on alternating or direct current.

The invention has been shown in preferred form and by way of example only and obviously many modifications and variations can be made therein without departing from the spirit of the invention. The invention, therefore, is not limited to any specified form or embodiment except insofar as such limitations are expressly set forth in the claim.

I claim:

A sealed relay structure comprising a spool-like tunneled relay housing having integrally formed legs at both ends thereof, means defining slots open at the far ends in said legs, a sealed capsule within said housing and containing electrical contacts, an electrical winding on said housing, the energization and deenergization of said winding actuating said contacts, conductors connected with said contacts and extending beyond opposite ends of the sealed capsule, the external portions of said conductors bending at right angles and passing through slots in the slotted legs of the relay housing, the ends of said external conductors forming depending pins, means anchoring the conductors in said slots, depending pins forming terminals of said winding, and means mounting said depending pins forming terminals of said winding to the outer periphery of said winding, said mounting means including pin supporting strips conforming to the shape of the outer periphery of said winding, insulating means separating said winding and said strips, a rigid insulating base plate having holes therein through which said pins extend, and means affixing said base plate to the outer periphery of said winding.

References Cited in the file of this patent

UNITED STATES PATENTS

| | | |
|---|---|---|
| 2,923,791 | Corbitt et al. | Feb. 2, 1960 |
| 2,957,961 | Juptner | Oct. 25, 1960 |
| 3,128,356 | Lychyk et al. | Apr. 7, 1964 |

OTHER REFERENCES

IBM Technical Disclosure, volume 4, Number 11, dated April 1962, page 22.

IBM Technical Disclosure, volume 4, No. 7, December 1961.